G. H. GIBSON.
FLOW INTEGRATING AND RECORDING INSTRUMENT.
APPLICATION FILED JAN. 21, 1914.

1,290,170.

Patented Jan. 7, 1919.
2 SHEETS—SHEET 1.

G. H. GIBSON.
FLOW INTEGRATING AND RECORDING INSTRUMENT.
APPLICATION FILED JAN. 21, 1914.

1,290,170.

Patented Jan. 7, 1919.
2 SHEETS—SHEET 2.

WITNESSES
INVENTOR
BY
ATTORNEY

UNITED STATES PATENT OFFICE.

GEORGE H. GIBSON, OF MONTCLAIR, NEW JERSEY.

FLOW INTEGRATING AND RECORDING INSTRUMENT.

1,290,170.  Specification of Letters Patent.  Patented Jan. 7, 1919.

Application filed January 21, 1914. Serial No. 813,379.

*To all whom it may concern:*

Be it known that I, GEORGE H. GIBSON, a citizen of the United States, residing in Montclair, in the county of Essex and State of New Jersey, have invented certain new and useful Improvements in Flow Integrating and Recording Instruments, of which the following is a true and exact description, reference being had to the accompanying drawings, which form a part thereof.

My present invention consists in an improved form of integrating and recording instrument, especially devised and adapted for integrating and obtaining a record of the flow of a liquid over a weir, when actuated by a float or other actuating device responsive to the varying accumulation of the liquid on the supply side of the weir.

In general, the flow of liquid over a weir, while a function of, does not vary in linear proportion with the varying height of liquid level on the supply side of the weir. With weir measuring apparatus it is generally necessary, therefore, in order to obtain a record which may be readily computed by the use of an ordinary planimeter and which can be integrated, to employ a cam for translating the movements of the float or like device into movements of the recording point, and of the adjustable element of the integrating mechanism which are in linear proportion with the changes in the rate of flow over the weir.

The primary object of my present invention is to provide an accurate instrument for the purpose specified, characterized by its simplicity, reliability, and the small frictional resistance to the necessary movements of the parts. A further object of the invention is to provide an instrument in which one motion translating cam may be replaced by another to change the constant of the instrument as required to permit the instrument to be used under different operating conditions.

The various features of novelty which characterize my invention are pointed out with particularity in the claims annexed to and forming a part of this specification. For a better understanding of the invention, however, and of the advantages possessed by it, reference should be had to the accompanying drawings and descriptive matter in which I have illustrated and described a preferred form in which my invention may be embodied.

Figure 1:
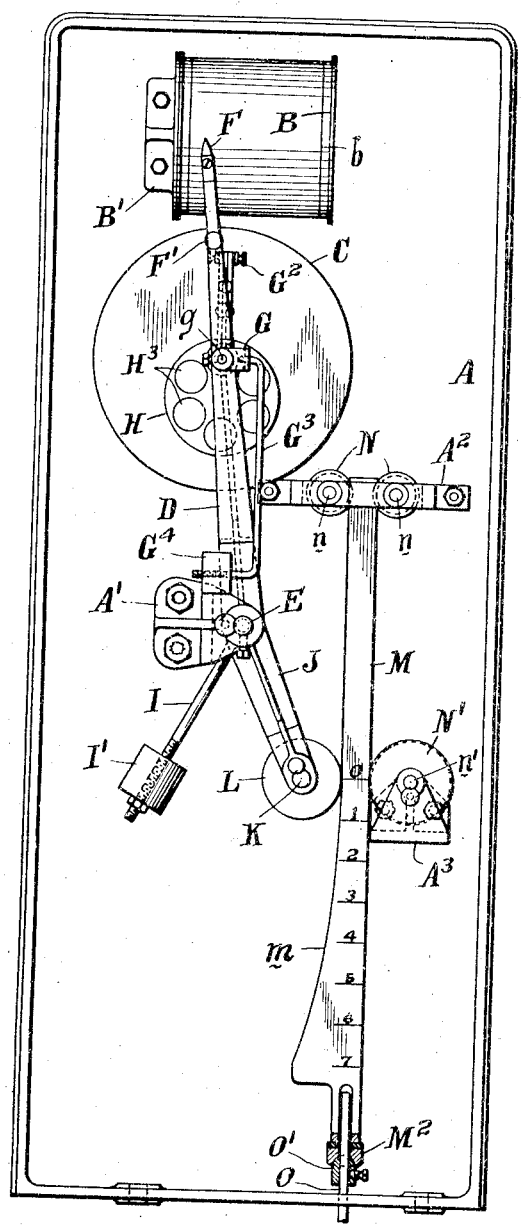
Figure 1 is a front elevation of the instrument with the cover removed.

In the drawings, A represents the vertical back wall or base of the instrument casing. B represents a drum carrying a record sheet or card $b$, and supported and continuously rotated by a clock mechanism B' which is secured to the casing wall A and is partially surrounded by the drum. Beneath the drum B is located a disk C, which is rotated about its horizontal axis at a uniform speed by the clock mechanism C' secured to the casing wall A. Coöperating with the recording drum B and the disk C is an oscillating element, or lever, comprising an arm D carried by a horizontal rock shaft D'. The rock shaft D' is formed with conical sockets in its ends, and is journaled by means of conical bearing pins E, E' entering these sockets and adjustably mounted in a yoke shaped bracket A' secured to the base wall A.

A pen F, adapted to trace a record on the record sheet $b$ carried by the drum B, is adjustably clamped to the upper end of the arm D as by means of the clamping screw F'. An integrating mechanism comprising a casing H which incloses a train of counting wheels, and supports the actuating wheel H' thereof, is pivotally connected to the arm D to turn with respect to the latter about a horizontal axis passing through the point of contact of the wheel H' with the face of the disk C against which the wheel H' bears at all times. Means are provided for maintaining the wheel H' in parallelism with itself as the arm D swings about the axis of the rock shaft D'. The means by which the casing H is connected to the arm D, and the wheel H' is automatically kept in parallelism with itself comprises a yoke-like member G which straddles the arm D and supports a pair of opposed horizontal pivot pins $g$ which enter sockets formed in the arm D.

The yoke member G is provided with an uprising arm G′, bifurcated at its free end, and having pivot pins G² mounted in the bifurcations. These pins form the pivotal support for the upper end of an arm H² by which the casing H is suspended. An arm G³ is secured to, and depending from the yoke G has a horizontal threaded lower end portion on which is adjustably mounted a weight G⁴. The axis of the pivot pins $g, g$ passes through the point of contact between the wheel H′ and the face of the disk C, and the arm G³ and weight G⁴ unite to form a pendulum holding the wheel H′ parallel to itself as the arm D swings back and forth about the axis of the pivot pins E.

Figure 3:
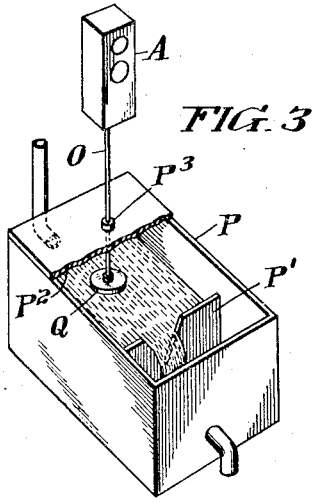
Fig. 3 is a perspective view illustrating the use of my improved instrument in connection with weir measuring apparatus.

The arm J is bifurcated at its lower end, and in the bifurcations are secured pivot pins K on which is journaled a wheel or anti-friction roll L, which bears against the cam edge $m$ of the motion translating cam M. A weight I′ adjustably secured to the lower end of the arm I carried by the shaft D′ holds the roll L against the cam M at all times. The shaft D′ and arm D are oscillated about their axis by means of the vertically movable motion translating cam bar M. The latter operates on the shaft D′ through the arm J secured at its upper end to the shaft. The upper portion of the cam bar M has parallel side edges passing between, and engaged by a pair of guide rolls N mounted on pivot pins $n$ mounted in a bracket A² secured to the casing wall A. A second guide roll N′ is journaled on pivot pins $n'$ carried by a bracket A³ secured to the casing wall A. The rolls L and N′ are at approximately the same level and the thrust of the roll L is transmitted directly through the cam bar M to the roll N′. The cam M is given its vertical movements by a rod O, which, as shown in Fig. 3, is the stem of a float Q supported by the liquid on the supply side of the weir plate P′ located in the weir tank P. As shown, the stem O of the float Q passes through a stuffing box P³ in the top wall of the tank P, and projects into the instrument case, where it is connected to the cam M. Advantageously, the connection between the rod O and cam M is such to not only permit of their ready separation but also to permit of a slight adjustment of the one part relative to the other if the rod and cam are out of alinement as the apparatus is actually installed and used. The connection between the rod O and cam bar M illustrated, comprises a collar O′ adjustably secured to the portion of the stem O projecting into the casing of the instrument. The collar O′ is formed with a spherical upper surface which enters a spherical cavity M² formed in the lower end of the member M, or rather, as shown, in a collar M² interposed between the collar O′ and the lower end of the member M. The member M is recessed at its lower end to loosely receive the upper end of the stem O. With the arrangement described the stem O may be drawn out from under the cam M and the latter may then be removed from the instrument for inspection or replacement. In case the bar M and stem O are not maintained in perfect alinement, the universal joint connection between these parts provided will prevent cramping.

Figure 4:
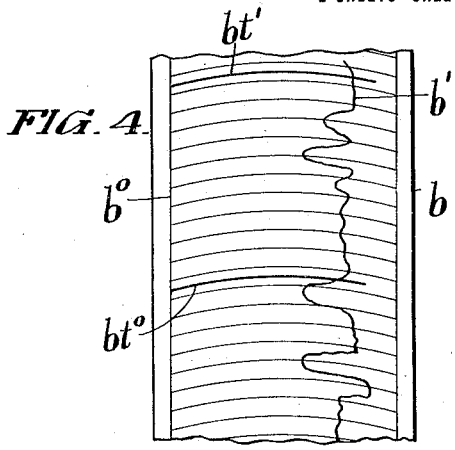
Fig. 4 is a view of a record sheet on which a record has been traced by the instrument.

I so form the contour of the cam edge $m$ of the cam bar M, that the pen F and the point of contact between the wheel H′ and disk C will be moved equal horizontal distances for equal increments of flow. In consequence, the rate of flow at any instant will be represented by the perpendicular distance between the base line $b^0$ of the record sheet $b$ (see Fig. 4) and the particular point on the curve $b'$ traced by the pen F at which the pen engages the record at said instant. The total volume of flow occurring in any period of time beginning with the instant at which the arc of possible movement of the point of the pen F relative to the record sheet is the arc $bt^0$, and ending at the instant at which the arc $bt'$ is the arc of possible movement of the pen point over the record sheet, can be computed by running a planimeter along the outline of the figure bounded by the lines $b^0$, $bt'$, $b'$ and $bt^0$. Advantageously, the record sheet is ruled with lines parallel to the lines $bt^0$ and $bt'$, as shown. Theoretically, for absolute accurate results, the record surface over which the pen travels should be a plane surface. It is usually preferable from a practical standpoint, however, to employ a cylindrical record surface, as shown; and in an instrument of the character shown, the errors due to the use of a cylindrical surface in place of a plane surface are too insignificant to have any practical bearing. With the arrangement described the sweep of the pen F over the record sheet may be made several times as great as the corresponding horizontal movement of the roll L. This makes it possible to obtain a record chart of conveniently great height without having the rise of the cam edge $m$ great enough to make the cam self-locking, or to be otherwise objectionable.

Figure 2:
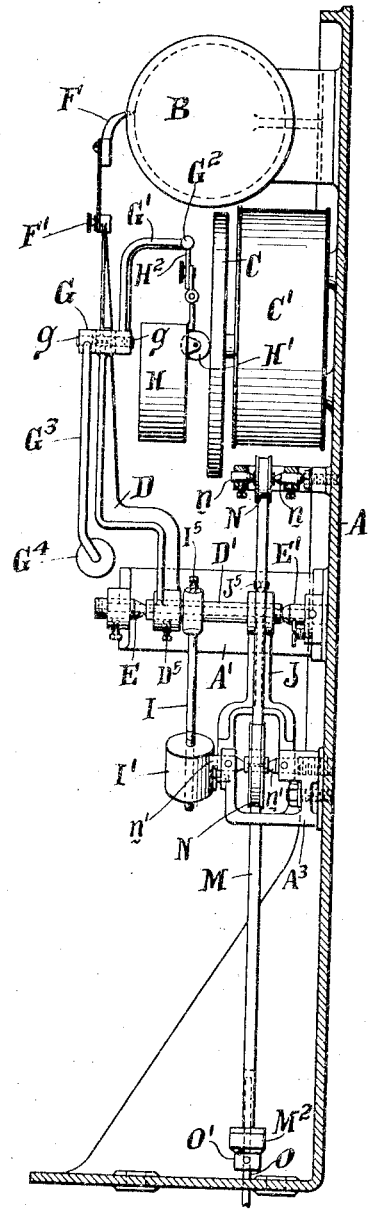
Fig. 2 is an elevation taken at right angles to Fig. 1, with the base of the instrument case in section.
Figure 5:
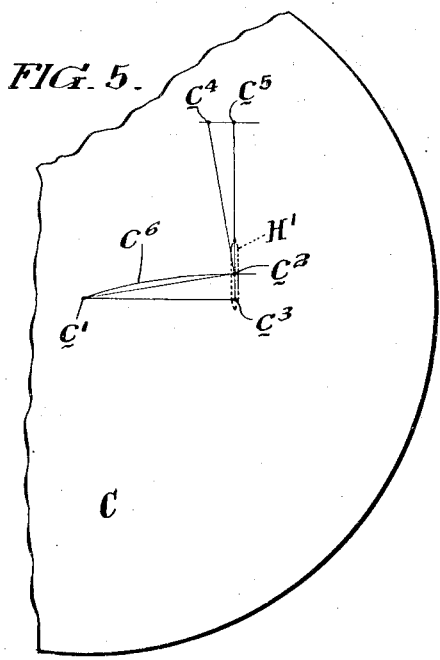
Fig. 5 is a diagram illustrating the operation of the integrating mechanism.
Figure 6:
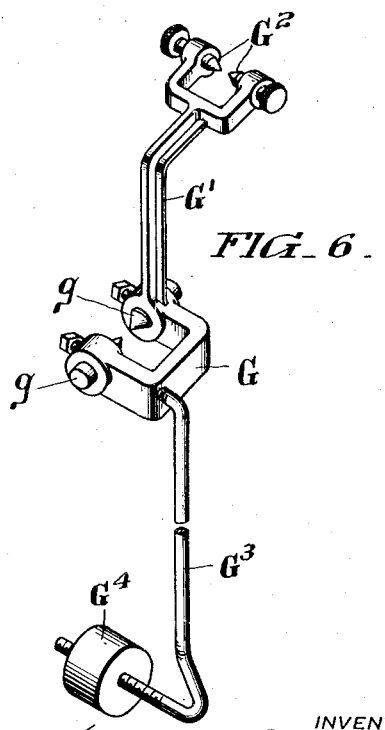
Fig. 6 is a perspective view of a portion of the mechanism.

The wheel H′ engages the disk C along an arc $c^6$ as shown in Fig. 5, in which, however, the departure of this arc from the horizontal line $c'—c^3$ is relatively greater than would be had in practice with the instrument shown in Figs. 1 and 2. Inasmuch as the horizontal displacement of the point of contact between the disk C and the wheel H′ of the integrating mechanism is in linear proportion to the rate of flow, it follows that the movement imparted to the wheel H′ by the disk C, when any point $c^2$ (see Fig. 5) is the point of contact between the wheel and disk, should be the same as would be imparted to the wheel if the latter were in contact with the disk C at the point $c^3$ at which a vertical line through the point $c^2$ intersects the horizontal line passing through the axis of the disk C. The velocity of the point $c^2$ about the center $c'$ may be represented by the line $c^2$—$c^4$ equal in length to the line $c'$—$c^2$, and perpendicular to the latter, and the velocity of the point $c^3$ will then be represented by a line equal in length to, and perpendicular to the line $c'$—$c^3$. The vertical component, $c^2$—$c^5$ of the line $c^2$—$c^4$ is obviously perpendicular to and equal in length to the line $c'$—$c^3$. The rotation imparted to the wheel H', when in contact with the disk C at the point $c^2$, will thus be the same as would be imparted to the wheel if in contact with the disk at the point $c^3$, since only the vertical component of the velocity of the disk C at the point of contact—the component parallel to the plane of the wheel H'—is effective in imparting rotating movements to the latter. Inasmuch as the point of contact between the disk C and wheel H' is in the line of the axis of the pivotal connection between the member G and arm D, the reaction between the wheel H' and disk C, as the wheel is moved across the face of the disk, does not tend to rotate the wheel H' about the said axis.

With instruments of the type referred to it is frequently desirable to use a single instrument, or instruments of one size and style, under quite different conditions. For instance, the range of movement of the actuating float Q in one installation may be twice that of the actuating float in another installation where it is desirable to use the same, or a similar integrating and recording instrument. It is desirable, of course, to have the maximum travel of the pen F correspond to the maximum range of movement of the cam bar M in each installation. This result may readily be had with the instrument described by the use of interchangeable cam bars M, using the particular cam bar in each installation which will give the full range of travel to the point F for the maximum movement of the actuating float and cam bar. In general, the substitution of one cam bar for another of different shape, necessitates the use of a different constant in computing the flow from the record traced by the pen F, and necessitates the use of a different factor in each case by which the indications of the dials $H^3$ of the integrating mechanism must be multiplied in order to obtain integration results in the same quantity units.

As shown, the arms D, I and J are detachably secured to the shaft D' by corresponding set screws $D^5$, $I^5$ and $J^5$, so that each of these arms may be angularly adjusted about the shaft D' relative to the other as may be required in calibrating the instrument and in insuring the proper pressure between the roll L and cam M throughout the range of relative movement of the parts L and M. This pressure may also be adjusted to some extent by running the weight I' up and down on the arm I. In calibrating the instrument, when a proper cam bar M has been inserted, it is only necessary to adjust the collar O' to bring the zero line of the cam bar into the same horizontal plane with the axis of the wheel L in the no flow position of the float Q and rod O, and to see that the arms J and D are so adjusted relatively to one another that the pen F will engage the record sheet along the proper base line when the wheel L is in the no flow position. When the portion of the cam bar immediately above the zero line has parallel edges, the adjustment of the arms F and L may be quickly tested at any time regardless of the rate of flow over the weir by simply depressing the bar M far enough so that the zero line is at or below the level of the axis of the roll L.

It will be understood, of course, that the usual provisions may be made for adjusting and locking in place the various pivotal bearing pins employed; and while I illustrate such means, it seems unnecessary to refer to them in detail. It is apparent, however, that the type of bearings which the character of my instrument permits me to use, makes it possible to reduce lost motion in the pivotal connections to a minimum, while at the same time keeping the frictional resistance to the movements of the parts desirably small.

The use of a reciprocating cam directly connected to, and rising and falling with the actuating float not only avoids all lost motion between the cam and float and simplifies the instrument as a whole, but has certain special advantages in so far as the formation of the cam is concerned. With a cam of this character, it is very easy to lay out the cam in accordance with the proper theoretical law, and to dress the cam edge as corrections may be found desirable after the cam has been installed in an instrument and tested. Furthermore, the duplication of cams of this type is exceedingly simple from a mechanical standpoint after an initial cam having the proper contour has once been made. The character of the cam employed in my instrument is especially desirable when the instrument is used in measuring water passing over V-notched weirs, since in a practical installation of this kind the cam is of convenient dimensions for its laying out and construction.

While in accordance with the provisions of the statutes, I have illustrated and described the best form of my invention now known to me, it will be apparent to those skilled in the art that changes may be made in the form of apparatus disclosed without departing from the spirit of my invention, and that under some conditions certain features of my invention may be used without a corresponding use of other features.

Having now described my invention, what I claim as new and desire to secure by Letters Patent, is:

1. In an instrument of the kind described, the combination of a stationary support provided with cam guides, a cam mounted therein and movable with respect thereto along a vertical line but held by said guides against rotative movement, an actuating float connected to said cam, a member mounted to oscillate about a horizontal axis and in constant and direct engagement with the cam and oscillated thereby as the cam is moved by the float, and flow exhibiting means actuated by said member.

2. In an instrument of the kind described, the combination of a stationary support provided with cam guides, a cam mounted therein and movable with respect thereto along a vertical line but held by said guides against rotative movement, an actuating float stem connected to said cam by a universal joint and an element mounted to oscillate and in constant and direct engagement with the cam and oscillated thereby as the cam is moved by the float, and flow exhibiting means actuated by said member.

3. In an instrument of the kind described, the combination of a constantly rotating disk, a member mounted to oscillate about an axis parallel to said disk, and an integrating element comprising a counting train and an actuating wheel engaging said disk, said element being pivotally connected to said member to turn with respect thereto about an axis parallel to the first mentioned axis and intersecting the point of contact between said wheel and disk, said instrument including provisions for maintaining said wheel in parallelism with itself as said member oscillates.

4. In an instrument of the kind described, the combination of a disk constantly rotating about a horizontal axis, a member mounted to oscillate about an axis parallel to the axis of said disk, and an integrating element comprising a counting train and an actuating wheel engaging said disk, said element being pivotally connected to said member to turn with respect thereto about an axis parallel to the first mentioned axis and intersecting the point of contact between said wheel and disk and having its center of gravity below the axis of its pivotal connection to said member whereby said wheel is maintained in parallelism with itself as said member oscillates.

5. In an instrument of the kind described, the combination of means for giving motion to a record surface, a constantly rotating disk, a member mounted to oscillate about an axis parallel to the axis of said disk, a marking device carried by said member, an integrating element comprising a counting train and an actuating wheel engaging said disk, said element being pivotally connected to said member to turn with respect thereto about an axis parallel to the first mentioned axes and intersecting the point of contact between said wheel and disk, and means for oscillating said element, said instrument including provisions for maintaining said wheel in parallelism with itself as said member oscillates.

6. In an instrument of the kind described, the combination of means for giving motion to a record surface, a disk constantly rotating about a horizontal axis, a member mounted to oscillate about an axis parallel to the axis of said disk, a marking device carried by said member, an integrating element comprising a counting train and an actuating wheel engaging said disk, said element being pivotally connected to said member to turn with respect thereto about an axis parallel to the first mentioned axes and intersecting the point of contact between said wheel and disk and having its center of gravity below the axis of its pivotal connection to said member whereby said wheel is maintained in parallelism as said member oscillates, and means for oscillating said member.

GEORGE H. GIBSON.

Witnesses:
NORMAN K. COUDERMAN,
ROBERT G. CLIFTON.

Copies of this patent may be obtained for five cents each, by addressing the "Commissioner of Patents, Washington, D. C."